(12) United States Patent
Stone et al.

(10) Patent No.: US 12,101,333 B1
(45) Date of Patent: Sep. 24, 2024

(54) SECURE, IMMUTABLE AND VERIFIABLE INFORMATION CAPTURE

(71) Applicant: Issured Limited, London (GB)

(72) Inventors: Jeddiah Stone, London (GB); Andrew Evans, London (GB); Jonathan Empson, London (GB)

(73) Assignee: Issured Limited, London (GB)

( * ) Notice: Subject to any disclaimer, the term of this patent is extended or adjusted under 35 U.S.C. 154(b) by 0 days.

(21) Appl. No.: 18/461,055

(22) Filed: Sep. 5, 2023

(51) Int. Cl.
| | | |
|---|---|---|
| *G06F 21/78* | (2013.01) | |
| *G06F 16/13* | (2019.01) | |
| *G06F 21/62* | (2013.01) | |
| *G06F 21/64* | (2013.01) | |
| *H04L 9/40* | (2022.01) | |
| *G06F 21/71* | (2013.01) | |
| *G06Q 50/18* | (2012.01) | |

(52) U.S. Cl.
CPC .......... *H04L 63/123* (2013.01); *G06F 16/137* (2019.01); *G06F 21/6218* (2013.01); *H04L 63/0428* (2013.01); *G06F 2221/2101* (2013.01); *G06Q 50/18* (2013.01)

(58) Field of Classification Search
None
See application file for complete search history.

(56) References Cited

U.S. PATENT DOCUMENTS

| | | | |
|---|---|---|---|
| 11,271,716 B1 * | 3/2022 | Woerner | ............. G06F 21/6209 |
| 11,539,774 B2 | 12/2022 | Beardsworth et al. | |
| 2020/0357085 A1 * | 11/2020 | Yang | ..................... G06Q 50/182 |
| 2020/0372184 A1 * | 11/2020 | Meirosu | ................. G06Q 20/02 |
| 2021/0049716 A1 * | 2/2021 | Li | ......................... H04L 9/3297 |
| 2021/0099772 A1 * | 4/2021 | Lee | ...................... H04N 21/845 |
| 2021/0385091 A1 * | 12/2021 | Shenoy | ..................... H04N 7/15 |
| 2022/0069978 A1 * | 3/2022 | Yang | ..................... G06V 20/47 |
| 2022/0188815 A1 * | 6/2022 | Higgins | ............. G06Q 20/4014 |
| 2023/0185767 A1 * | 6/2023 | Hung | .................... G06F 16/152 |
| | | | 713/189 |
| 2023/0274373 A1 * | 8/2023 | Dixit | ...................... G06Q 50/18 |
| | | | 705/311 |

OTHER PUBLICATIONS

MEa-Fuse (Year: 2022).*

* cited by examiner

*Primary Examiner* — Venkat Perungavoor
(74) *Attorney, Agent, or Firm* — Dority & Manning, P.A.

(57) ABSTRACT

A method of facilitating generation of a verifiable and immutable record. The method comprises, at a user device, obtaining a data file, generating an audit file for the data file, and separately hashing the data file and the audit file. The method further comprises storing the data file, the audit file and the hash values in a secure memory location, access to which is controlled, and preventing changes to the stored data by a user. When access is available to a remote server system, the stored data is sent to the remote server system and, in response, a notification received over confirming that the remote server system has verified the data file and the audit file and has created an immutable record of both. The user is then permitted to change the stored data file and or audit file in the secure memory location.

7 Claims, 8 Drawing Sheets

SECURE, IMMUTABLE AND VERIFIABLE INFORMATION CAPTURE

TECHNICAL FIELD

The present invention relates to the provision of secure, immutable and verifiable information capture.

BACKGROUND

The recording of any media type including video recording of interviews, hearings etc is commonplace for many purposes, especially in the legal and criminal justice field. It is of course relatively straightforward to store data extracted from the recording device for evidential purposes on a tape, hard drive or other physical media. The same is true of other forms of evidence including audio recordings, photographs, and written notes (e.g. witness statements).

U.S. Pat. No. 11,539,774 describes a method of creating an immutable digital record of a video conference conducted over the Internet and involving two or more parties. Interview data-streams and digitally transcribed text records are stored at a server or servers or associated databases. At the same time, a hash value is generated across the data streams and the text records and saved to a Blockchain ledger. The hash and Blockchain ledger can be used at a later time to verify the authenticity of the streams and records.

It is now commonplace for evidence to be captured and stored at end-user devices such as personal computers, laptop computers, and smartphones. This may be necessary for example when a law enforcement officer attends a scene-of-crime and the evidence must be capture in situ for various reasons. In some circumstances network connectivity may be unavailable in which case the data will be stored only at the end-user device, albeit temporarily, until connectivity is re-established. Whilst mechanisms exist for securely storing data on such an end-user device, these are unlikely to meet the evidentiary requirements of a court of law. Furthermore, it is often desirable to allow previously captured or generated evidence and other data to be copied, shared or edited in a secure and immutable manner whilst ensuring the a "chain-of-custody" exists between the current version and an original.

SUMMARY

According to a first aspect of the present invention there is provided a method of facilitating generation of a verifiable and immutable record. The method comprises, at an end user computer device, obtaining a user data file, generating a device audit file for the user data file including metadata associated with the user data file and or the end user computer device, and separately hashing the user data file and the device audit file to generate a user data file hash value and a device audit file hash value. The method further comprises storing the user data file, the device audit file and the respective hash values in a secure memory location of the end user computer device, access to which secure memory location is controlled by a system administrator, and preventing changes to the stored data by a user of the user device. When access is available to a remote server system, the stored data is sent to the remote server system over a secure connection and, in response, a notification received over the secure connection confirming that the remote server system has verified the user data file and the device audit file and has created an immutable record of both. As a result of receipt of said response, the user is permitted to change the stored user data file and or device audit file in the secure memory location.

The step of obtaining a user data file may includes one or more of:
capturing an image or video using a camera of the user computer device;
capturing audio using a microphone of the user computer device; and
selecting a data file from a memory of the user computer device.

The method may be carried out by or using an application executing on the user computer device, the application being under the control of said system administrator. Alternatively, the method may be carried out using an instance of a web browser at the user computer device.

The generation of a verifiable and immutable record may be for the purpose of recording evidence for future legal proceedings.

According to a second aspect of the present invention there is provided a method of generating a verifiable and immutable record. The method comprises, at a server system, receiving from an end user computer device over a secure connection a user data file, a device audit file, and respective hash values, hashing the user data file and the device audit file to generate respective hash values and comparing these hash values against the received hash values to validate the received data, creating a server-side audit file, and generating a hash value for the server-side audit file. The method further comprises storing as a parent transaction record, the user data file, the device audit file, the server side audit file, and respective hash values, the parent transaction record being identified by a parent database URN, carrying out a Blockchain transaction to commit to a Blockchain service a Master File including the hash values and the parent database URN, where the parent database URN can be used subsequently by the server system to retrieve the Master File from the blockchain service, and sending to the end user computer over the secure connection a notification confirming that the server system has verified the received data and has created an immutable record of the user data file and device audit file.

The verifiable and immutable record may be used subsequently as evidence in legal proceedings.

The server system being implemented as a cloud server system, for example using the Microsoft Azure™ platform.

According to a third aspect of the present invention there is provided method of generating a verifiable and immutable record of an edited version of the user data file of the above second aspect. The method comprises retrieving the user data file, the associated hash value and the parent database URN, from the parent transaction record, using the parent database URN to retrieve the Master File from the Blockchain service and using the Master File to validate the user data file, obtaining an edited version of the user data file, hashing the edited version to generate an associated hash value, and creating an updated server-side audit file. The method further comprises generating a hash value for the updated server-side audit file, storing as a child transaction record, the edited version of the user data file, the updated server side audit file, respective hash values and the parent database URN, the child transaction record being identified by a child database URN, and carrying out a Blockchain transaction to commit to the Blockchain service a child Master File including the child database URN, the parent database URN, and the hash values of the edited version of the user data file and of the updated server side audit file, where the child database URN can be used subsequently by the server system to retrieve the child Master File from the blockchain service.

The method may comprises repeating the process for a further edited version of the first edited version of the user data file, where the parent database URN is replaced by the first child database URN and a new child database URN is used to identify a new child transaction record.

The step of obtaining an edited version of a user data file may comprise receiving instructions to edit the user data file from an end user computer device.

According to a further aspect of the present invention there is provided a method of verifying an edited version of an edited user data file stored in a child transaction record according to the above third aspect. The method comprises using the child database URN of the edited user data file to obtain the associated new Master File from the Blockchain service, using hash values contained in the new Master File to validate the edited user data file, and, if the new Master File includes a database URN of a preceding child transaction record or a parent transaction record, repeating the process for the preceding child transaction record or a parent transaction record and, if necessary, for each further preceding child transaction record until the parent transaction record has been validated.

According to a still further aspect of the present invention there is provided a non-transitory computer-readable medium having stored therein instructions that, when executed by a processor, perform a method of facilitating generation of a verifiable and immutable record. The method comprises, at an end user computer device, obtaining a user data file, generating a device audit file for the user data file including metadata associated with the user data file and or the end user computer device, separately hashing the user data file and the device audit file to generate a user data file hash value and a device audit file hash value, and storing the user data file, the device audit file and the respective hash values in a secure memory location of the end user computer device, access to which secure memory location is controlled by a system administrator, and preventing changes to the stored data by a user of the user device. When access is available to a remote server system, the stored data is sent to the remote server system over a secure connection and, in response, a notification is received over the secure connection confirming that the remote server system has verified the user data file and the device audit file and has created an immutable record of both. As a result of receipt of said response, the user is permitted to change the stored user data file and or device audit file in the secure memory location.

DETAILED DESCRIPTION

Figure 1:
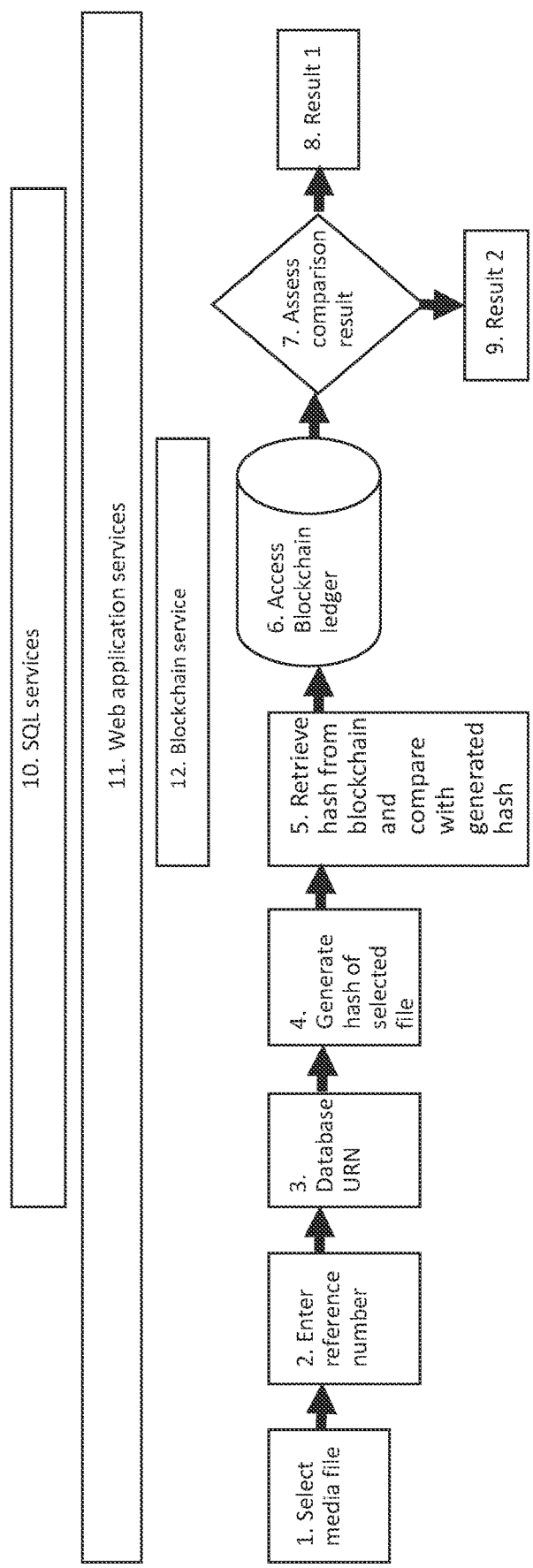
FIG. 1 illustrates schematically a prior art service for subsequently validating a previously stored interview record.

U.S. Pat. No. 11,539,774 describes a method of providing an immutable video interview record or digital diary record which involves the use and integration of secure hash algorithms, Blockchain technology and platform agnostic web-based video conferencing protocols. In particular, an immutable approach is proposed that uses Hyperledger Fabric Blockchain and SHA256 to provide a unique reference to meet high digital evidence immutability requirements. In addition, the system and method utilise 'use cases' developed to inform the functionality in terms of use and presentation of materials to meet a law enforcement and formal record keeping environment for secure interviews, with only the need for a web browser on end user devices. The desire to be infrastructure agonistic is an area that is proposed because it removes the risk of an interviewee claiming that there has been anything installed on his or her device, whilst enabling a download of an interview record only to the device and not using direct APIs. The writing of the SHA256 hash to the Blockchain and using these two digital records to indicate immutability is key to the design. This enables the submission of records to the component that provides the hash and Blockchain reference certificate.

In an exemplary known embodiment, an interviewer uses his or her device to log on to an account established with a service provider over the Internet, using a standard web browser such as Google Chrome™. The interviewer sets up the interview and obtains a unique interview URL. This can be sent to the interviewee, e.g. in an email or calendar invitation. At the allocated time, both the interviewer and the interviewee access the interview video conference via their web browsers, but the interviewer must accept the interviewee into the interview.

The method of U.S. Pat. No. 11,539,774 records voice and video streams of the participants separately and in real time, thereby allowing the voice streams to be transcripted separately and attributed to the correct speaker. The separately recorded video and audio streams are saved as a bundle in the appropriate client domain store, and can be accessed subsequently only with the necessary access credentials. The records may be encrypted to prevent unauthorised access. [All stored data is encrypted at rest (i.e. while data is sitting in the store waiting to be accessed) and each video stream is encrypted]. The client data store may be hosted, for example, by the Microsoft Azure™ platform, often referred to as Azure, which is a cloud computing platform and which offers access, management, and development of applications and services through global data centres.

In order to allow the recorded interview data to be verified at a later time, immediately following the recording of the data, a SHA256 hash is created over the recorded video data. The service then writes the hash to a Blockchain service, e.g. the Hyperledger Fabric Blockchain. Note that the recorded data itself is not stored in the Blockchain ledger, only the hash. A unique identifier, a database URN, is created as part of this process and acts as a pointer to the Blockchain record. The pointer is stored together with the recorded interview data in the client store.

FIG. 1 illustrates schematically a service for subsequently validating a previously stored interview record, and including the following functions and interactions, with reference numbers indicated:

A local media file to be accessed is selected from the local data store, ready for it to be uploaded for validation against its unique hash and Blockchain reference, 1.

The original reference number as attached is used for the validation of the record and is entered at this point, 2.

The database URN for comparison, 3.

A new hash for the selected file is generated, 4.

Using the database URN, the original hash is retrieved from the Blockchain and is compared with the newly generated hash, 5.

The distributed Blockchain ledger, 6.

The assessment of the comparison to be made, resulting in results 8 or 9 depending on whether the validation is correct or not.

The SQL services, 10.

The Web application services, 11.

The Blockchain services, 12.

A method is presented here that allows evidence captured locally at a user device to be securely, immutably and verifiably stored (possibly temporarily) at that user device, and to be subsequently uploaded to a centralised service that meets similar (evidentiality) standards. The method may be integrated into the interview service described above, such that the captured and stored evidence can be accessed subsequently using the service described with reference to FIG. 1. Of course, other access services may be used. The method also provides for securely, immutably and verifiably storing an event log or "audit record" to record accesses and changes to captured and stored data.

Figure 2:
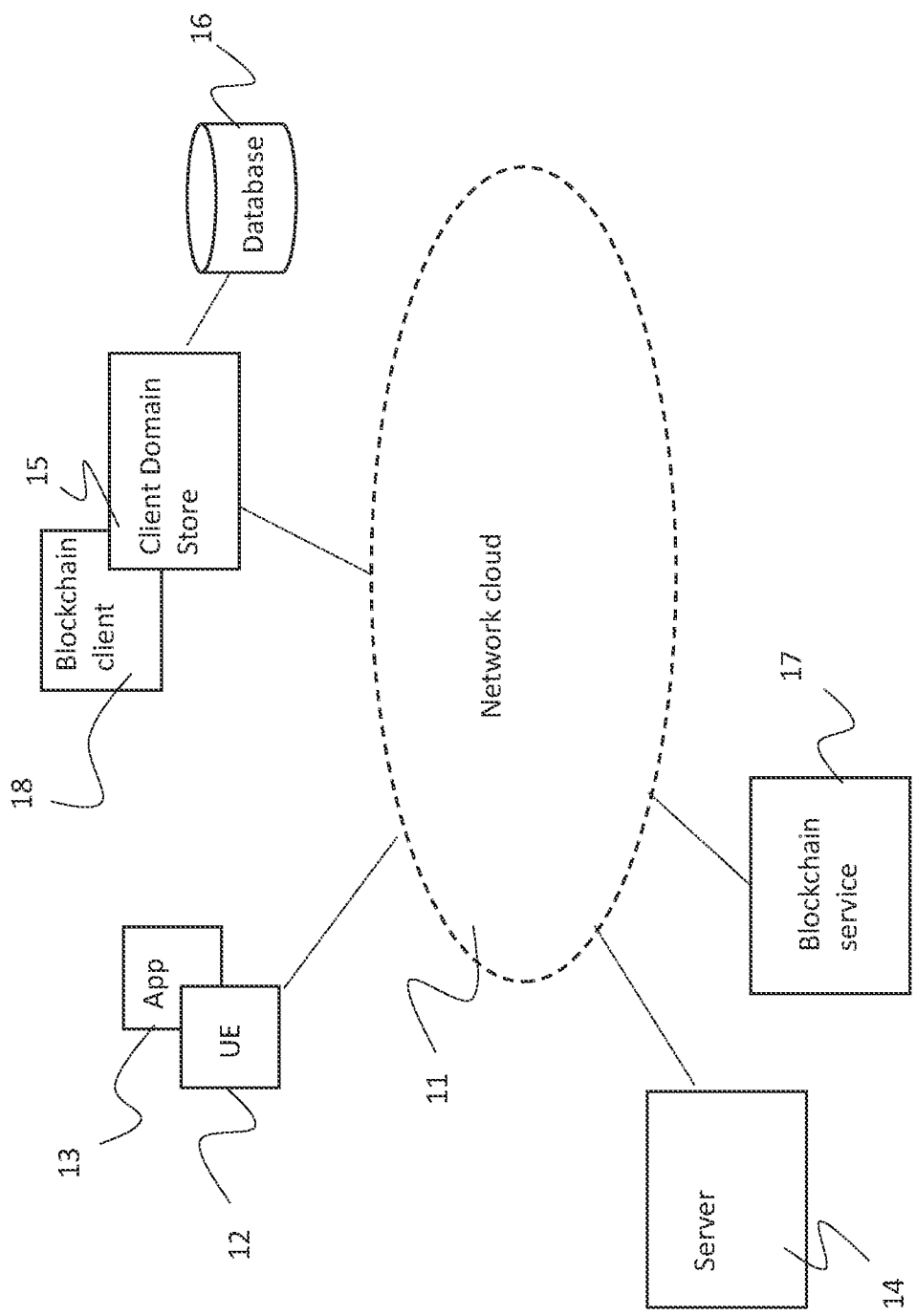
FIG. 2 illustrates schematically a network architecture for capturing, transferring and accessing secure data records.

FIG. 2 illustrates schematically a system architecture in which various components communicate over wired and wireless communication channels illustrated by the network cloud 11 and interconnecting links. The network cloud and links may comprise the Internet and wireless networks such as PLMN networks including 5G networks and WiFi™. The components illustrated include an end-user device 12 which may be, for example, a smartphone or tablet with 5G and WiFi connectivity. For simplicity the end-user device 12 is referred to here as User Equipment (UE) although that is not intended to be in any way limiting.

In an example the UE 12 is a smartphone running the Android™ or iOS™ operating system. As is well known such UEs provide a platform on which users and system administrators can install and manage applications or "apps" to implement various functionality. Such apps are implemented in software. Indicated by numeral 13 is a third party app referred to here as an Issured™ app (or "Mea: Fuse™" mobile application). The Issured app 13 is securely installed on the UE 12 by a system administrator via a computer service component indicated in the drawing by numeral 14. The component 14 may be a server, set of servers, or cloud service, with user access terminals. Installation is such that the user of the UE 12 cannot modify at least certain security features set for the Issured app 13. The system administrator may centrally manage a number of UEs of the same or different type.

The app 13 may be opened on the UE 12 and various functions of the app used to capture data. For example, the app may allow video and/or audio, still images, fingerprints, text data etc to be captured using standard features of the UE. This data is referred to below as "user data" and stored as a user data file. The app additionally captures certain defined meta data associated with the user data (which may be in addition to meta data contained within the user data file itself). This might include, for example, time and data of capture, location of the user device at the time of capture, UE type, camera identified, etc. The meta data is contained within a device audit file, and the app stores the device audit file in association with the user data file.

Immediately following capture/creation, the user data file and associated device audit file are stored securely on the UE in a memory location controlled by the Issured app. At this time, at least the user data file can be viewed (or listened to in the case of audio) by the user, but not modified, copied or deleted. The device audit file cannot be modified by the user. The app simultaneously, or subsequently, generates a first hash value (e.g. a SHA256 hash value) across the user data file and stores the first hash value in the secure memory location in association with user data file. As with the data record the user is prevented from modifying or deleting the first hash value. Similarly, the app generates a second hash across the device audit file and saves the second hash such that it cannot be modified or deleted. The user data file, device audit file, and the first and second hashes together form a "transaction record".

The app then checks whether or not the UE 12 is connected to the network cloud 11, e.g. via a 5G PLMN or a WiFi network, and is able to access a client domain store 15, e.g. hosted on Azure™. [The client domain store is also referred to hereinafter as the "Mea Fuse™" web application]. In the event that no network connectivity and access is available to the UE, the UE will periodically re-check for connectivity and access. In the meantime the user is blocked from modifying or deleting the data forming the transaction record.

If connectivity and access is available, or when that does become available, the app 12 securely transfers the transaction record to the client domain store 15, e.g. using an SSL or TLS connection. Upon receipt of this transaction record, the client domain store saves the record in an associated database 16 together with a unique database reference number (URN). The client domain store verifies that the user data file and device audit file are authentic and unchanged by regenerating SHA256 hash values for both and comparing these hash values with the first and second hash values within the received transaction record. Assuming that verification is achieved, the process continues, otherwise an error is flagged and the process stopped.

In the event of a successful verification of the transaction record by the client domain store 15, the store establishes a store-side audit file and generates a further, third hash value across that file. The store-side audit file might include, for example, time of creation and data concerning the source of the transaction record. The store-side audit file and the third hash values are saved into the database 16 with the transaction record to create an "enhanced transaction record".

The client domain store 15 now initiates a Blockchain transaction directly with a Blockchain service 17 via the network cloud 11. This is achieved using a Blockchain client 18 provided on the client domain store 15. It will be appreciated that the Blockchain service 17, whilst illustrated in the Figure as a single component, is in fact a distributed service such as the Hyperledger Fabric Blockchain service. The transaction involves the Blockchain client 18 committing a Master File to the Blockchain. The Master File contains the database URN for the transaction record, a current date and time, and the first second and third hash values, that is the hash values associated with the user data file, the device audit file and the store-side audit file.

Assuming that the Blockchain transaction is completed successfully, the Blockchain service 17 returns a Blockchain Transaction ID to the Blockchain client 18, confirming successful completion. The client domain store 15 adds the Transaction ID to the enhanced transaction record in the database 16 as an indication of the successful Blockchain transaction. The client domain store 15 then sends a transaction complete acknowledgement, including the database URN, to the Issured app 13 at the UE 12 over a secure connection. Upon receipt of the acknowledgement, the Issured app changes the status of the user data file to permit moving, renaming and editing of the data record by the user. NB. These actions will require network connection and interaction with the client domain store 15 as will be described further below.

It will be appreciated that, at this stage, not only is the user data file and server-side audit record stored securely in the database 16 associated with the client domain store 15, respective and verified hash values are stored in the Blockchain ledger. As will be discussed further below, the latter allow a user with access privileges to confirm at a later time that a copy of the user data file that he or she is viewing or otherwise accessing, is unchanged over the originally captured or generated user data file. Such a user can similarly access and validate the server-side audit file.

Any user with appropriate authorisation may subsequently view a user data file or associated audit record that has been successfully saved to the database 16 of the client domain store 15. The user may be the same user that captured or generated the user data file in the first place or may be a different user. Such access may be made via the Issured app or may be made via a web browser. Accesses are of course made securely, e.g. using login credentials. A user may identify a particular user data file and audit record by entering the associated database URN or by browsing a list of available user data files, e.g. associated with previously entered "friendly" file titles.

Figure 3:
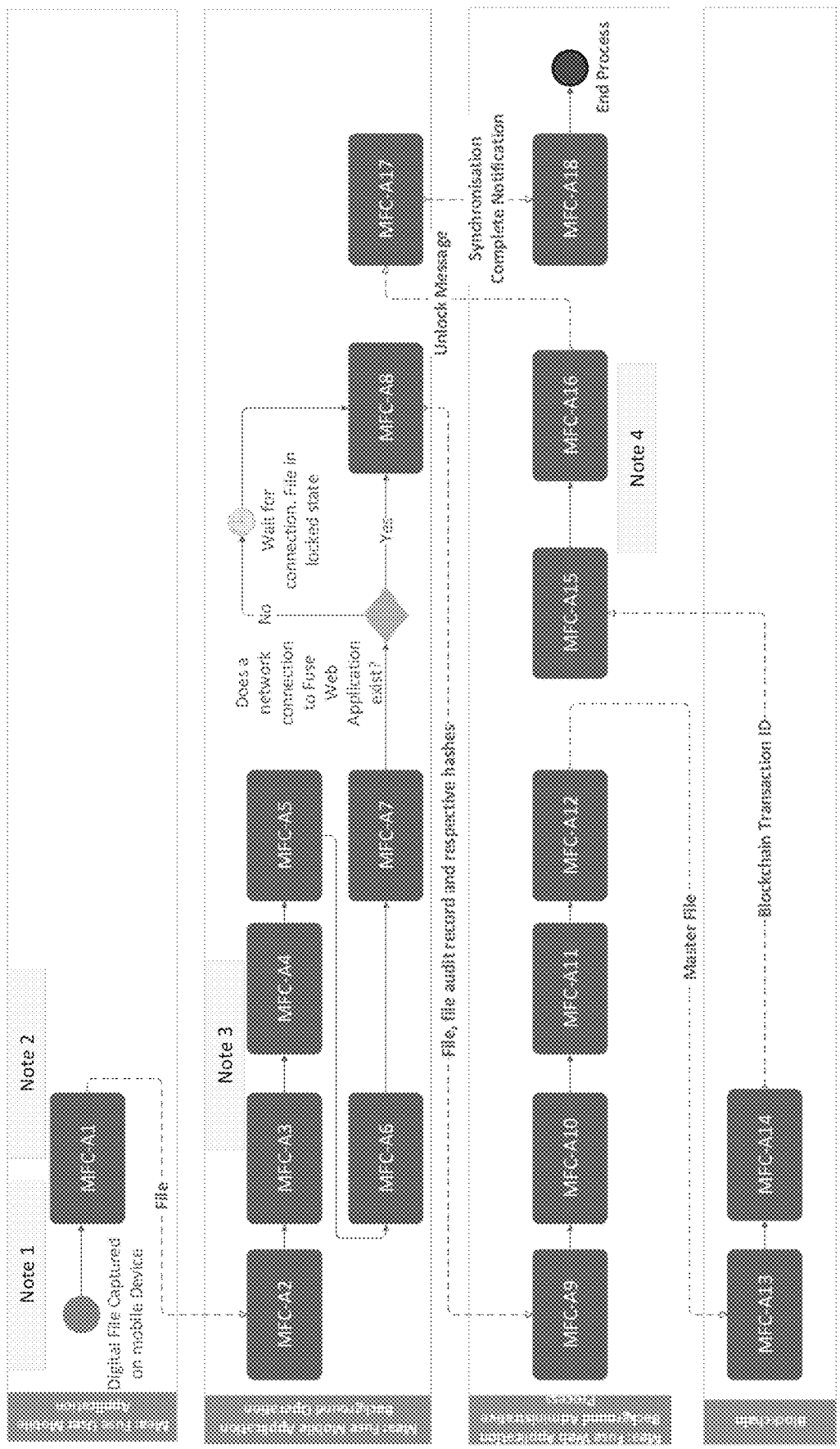
FIG. 3 illustrates a process for capturing a user data file on a user device and for storing that file on a client domain store in an immutable and verifiable manner.

The procedure for uploading a UE captured or generated user data file is illustrated further in FIG. 3, where the process steps of the Figure are identified in Table 1 below.

Considering now a process for viewing, copying or modifying a user data file previously saved to the client domain store 15 and associated database 16, as previously noted this may be done via the Issured app on a UE or may be done using a web browser interface. It is noted that, during this process, the original user data file, and any copy or edited copy of that file, is retained at the client domain store 15 and associated database 16. A user merely views on his or her device a copy of the file, or copy of the copy, to facilitate user interaction. This also applies when a user wishes to view the store-side audit file.

Figure 4:
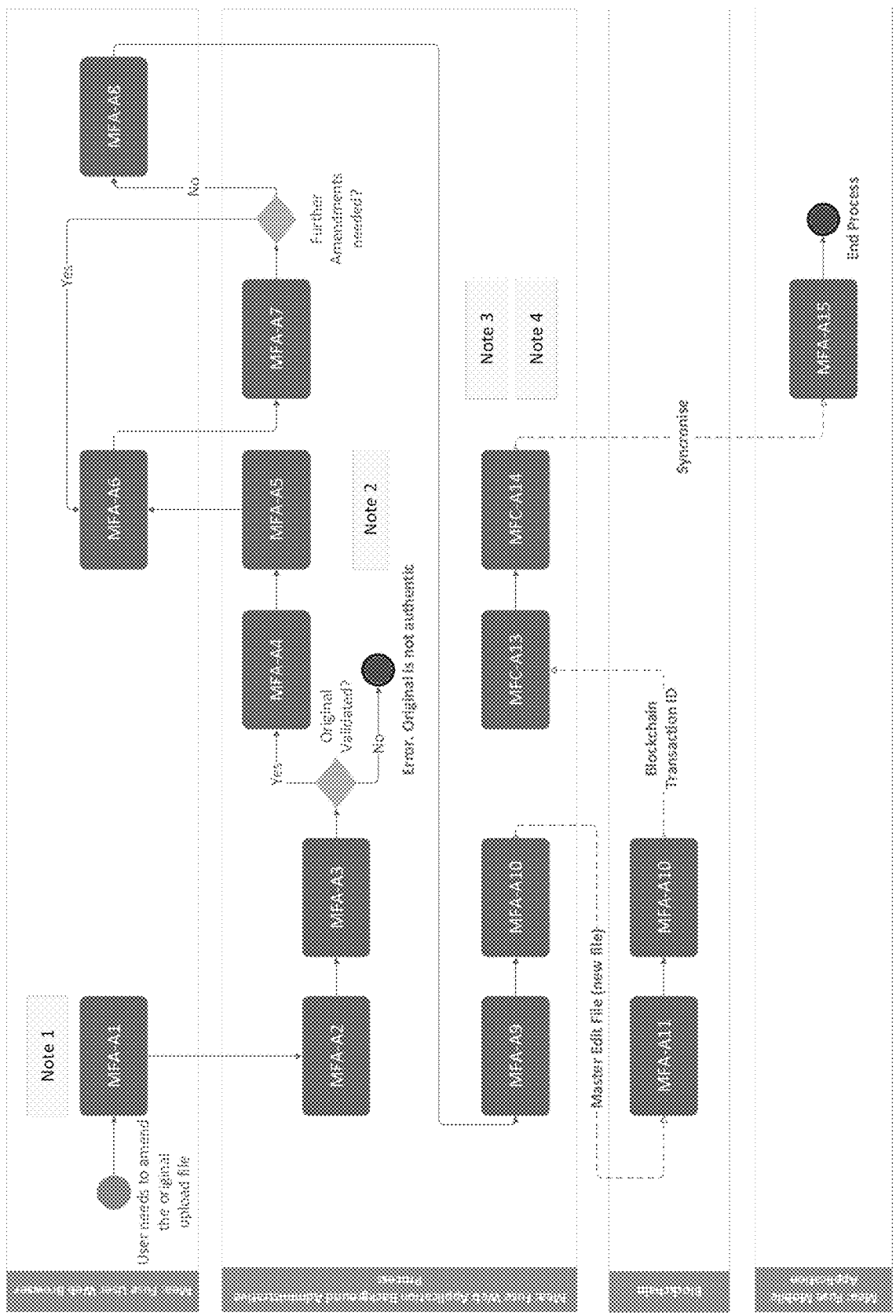
FIG. 4 illustrates a process for allowing a user to amend a user data file and for storing that amended file on a client domain store in an immutable and verifiable manner.

FIG. 4 illustrates in detail the viewing, copying or modifying of a user data file (or viewing a store-side audit file), assuming that the user performs this process via the Issured app on his or her UE. Reference is also made to Table 3 copied below which details the various process steps shown in the Figure.

The user first browses a list of available files and selects a file, e.g. using the associated database URN. In this case the user further select an option to amend the file. These actions cause the client domain store 15 to create and populate a further store side audit file including data concerning the present actions, i.e. access request by a user. The client domain store 15 verifies that the user data file and associated original store side audit file using a public validator. Further details are given below. If this validation step fails, an error is raised. If on the other hand the validation succeeds, the client domain store 15 makes a copy of the user data file and saves this in the database 16. The user is able to view and interact with the copy via the Issured app or a web browser. The user may for example choose to crop the image, enlarge a region of interest, or add a flag or marker to the image. After each edit, the client domain store 15 saves the amended user data file in association with the database URN of the original record.

Once the user is happy with the changes, he or she chooses to commit the changes. The newly created store side audit file is updated, e.g. to record the nature of the changes made. Respective hash values are created for edited user data file and the newly created store side audit file. The edited user data file, newly created store side audit file, and the respective hash values together form a new or "child" transaction record. The child transaction record includes a new database URN, i.e. child URN, for the record, as well as the URN of the parent record, i.e. the parent database URN.

A new Blockchain transaction is initiated via the Blockchain client 18. The new transaction involves committing a new Master File to the Blockchain. The new Master File contains the child database URN, a current date and time, hash values of the edited file and newly created store side audit file. Upon completion of the Blockchain transaction, a child Transaction ID is returned to the client domain store 15 and added to the child transaction record. The edited user data file is now available for viewing, copying or modifying by the same or other users. The newly created store side audit file is also available for viewing. Of course, the parent file and audit record remain available as well.

The process of FIG. 4 may be repeated as many times as necessary, each repeat generating a new child transaction record with associated child database URN and causing a new child Master File to be committed to the Blockchain. Each new child transaction record includes the database URN of the record from which the new record was generated. That may be the parent database URN or a previous child database URN.

Figure 5:
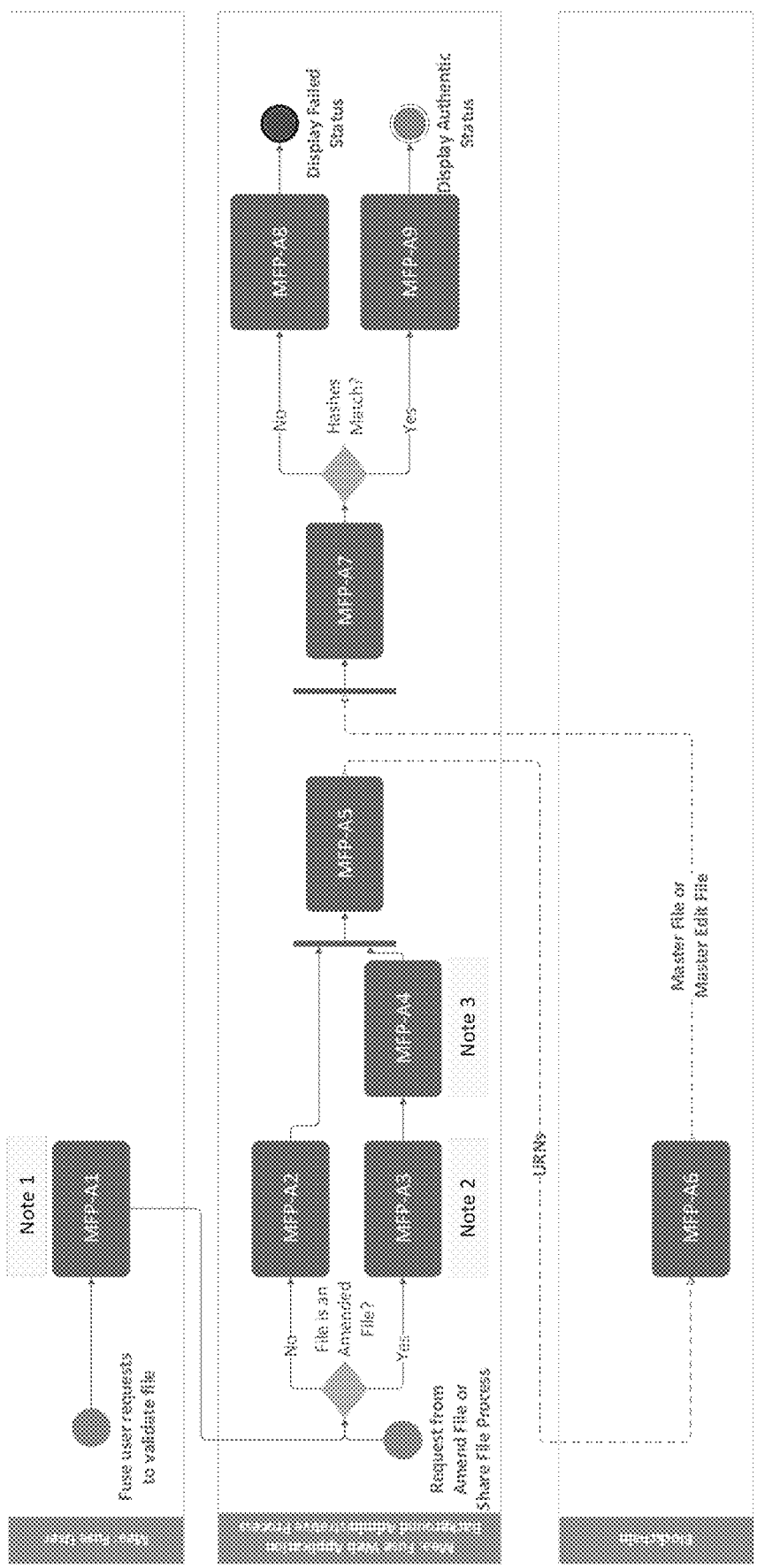
FIG. 5 illustrates a process for validating a file stored on a client domain store.
Figure 6:
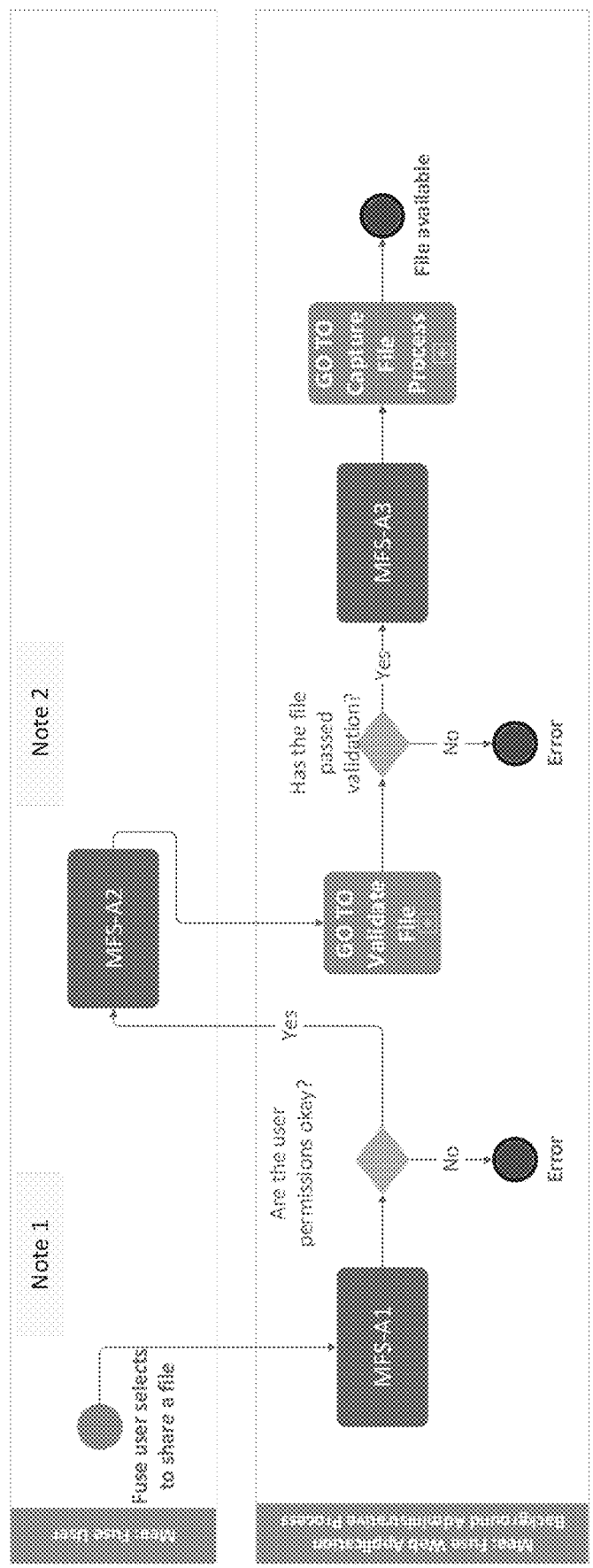
FIG. 6 illustrates a process for sharing a file stored on a client domain store.

FIG. 5 illustrates further a process for validating a user data file, be that an original file or an edited file, or a store side audit file, again, be that an original audit file or a child audit file. Table 3 defines the process steps.

The validation process typically commences when a user requests to validate a user data file. The user may for example use the Issured app or a web browser to select a user data file to be validated. Alternatively a validation process may be initiated from the store side, e.g. as a result of a user requesting to edit a file. If the file is an original file, i.e. a parent file, a hash of the selected user data file is generated. If the file is an edited file, i.e. a child file, a hash of that child file is generated together with a hash of the original, parent file. NB. Regardless of the number of child files in the record, validating a hash of the parent file is sufficient to validate a digital chain of custody from the child file that is being validated to the parent file as the former inherits validation from the parent via any intermediate child records.

A user may also submit a user data file for validation. For example a user may have been sent in an email a user data file and wishes to validate that file. The Issured app or web browser may allow the user to upload the received file to the client domain store for validation.

The client domain store 15 uses the Blockchain client to obtain the Blockchain Master Files for the file(s) to be validated, i.e. the parent file and, if necessary, the child file by submitting to the Blockchain service the parent database URN and child URN. The Blockchain service returns the respective Master files if available. The Blockchain client compares the relevant hash value(s) contained in the returned Master Files with newly generated hash value(s). If these match, validation of the files is confirmed. If not, a failed validation status is indicated.

The above processes have assumed that all users requiring access to a given user data file and/or audit file belong to the same store domains. In some cases however it may be required to share the files and records between users of different domains. FIG. 5 and associated Table 4 illustrate a process by which a user may share a file with another user in another domain, such that the sending user can trust the authenticity of the provided file.

The illustrated process assumes that a first user chooses to share a file with a user of another domain. Access permissions of both users are checked by the first user's client domain store 15. Assuming the checks are completed successfully, the first user selects a location to which the file will be shared. The client domain store 15 validates the file to be shared (and updates the store side audit record) and, assuming that validation is successful, transfers the file to the other domain. That other domain then treats the file as if it were a newly captured or generated file and follows the process of FIG. 3 from step MFC-A2. This creates a new and distinct record. Subsequent checks on the chain of custody will of course only authenticate back to this saved file and cannot authenticate back to the original parent file in the first domain.

Figure 7:
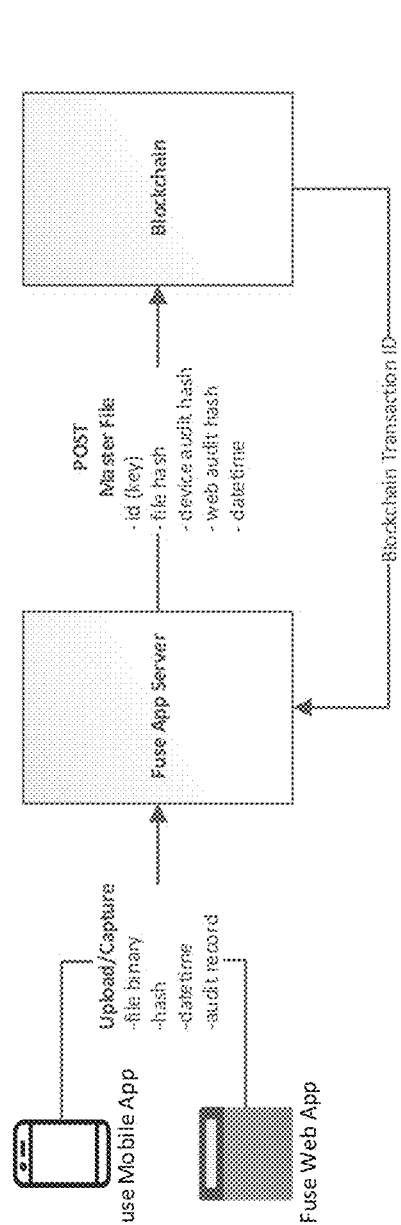
FIG. 7 further illustrates processes for saving and validating a single user data file.
Figure 7:
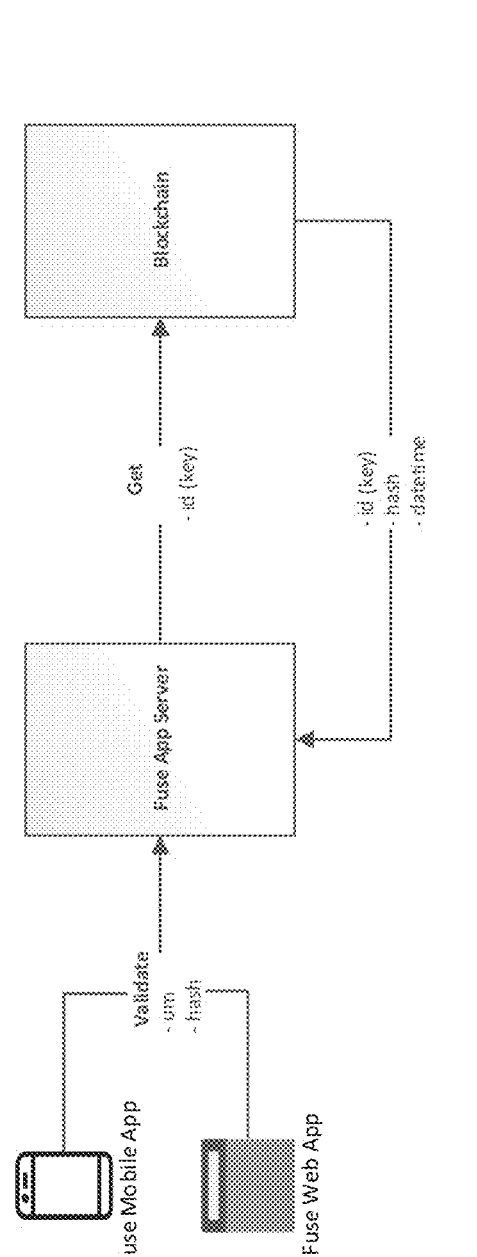

FIG. 7 provides a helpful illustration of the processes associated with "posting" and validating a single (parent) file to the client domain store 15, where the UE hosts the Issured app (Fuse Mobile app or Fuse Web app) and the client domain store 15 is implemented as a Fuse App Server, e.g. hosted on the Microsoft Azure™ platform. It will be noted that, in order to validate a file available to the App, the App generates a hash of that file and sends the hash to the Fuse App Sever together with the claimed database URN (urn).

Figure 8:
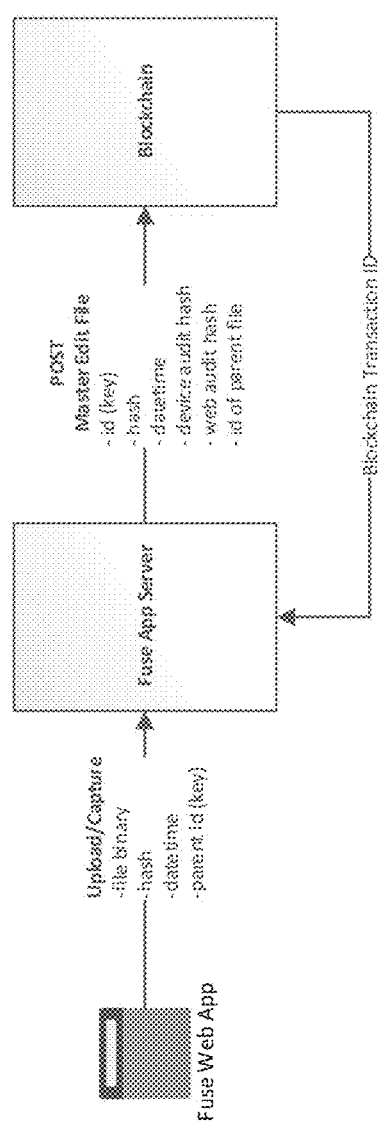
FIG. 8 further illustrates processes for saving and validating a complex user data file.
Figure 8:
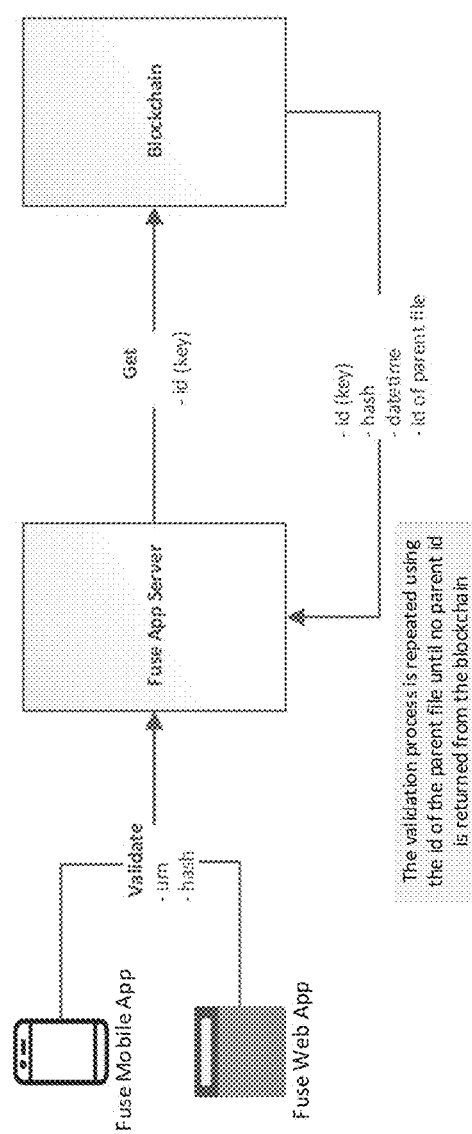

FIG. 8 provides a helpful illustration of the processes associated with "posting" and validating a complex (parent) child to the client domain store 15. In this validation process the Blockchain service initially returns a Master File containing, inter alia, the database URN of the transaction record from which the complex file was derived. The Fuse App server repeats the validation process for that record. This is repeated until no parent URN is returned.

It will be appreciated by the person of skill in the art that various modifications may be made to the above described embodiments without departing from the scope of the invention.

TABLE 1

| Process | Description |
| --- | --- |
| MFC-A1 | Open Mea: Fuse mobile application and select to import file or select to capture a file from the camera. |
| | Note-the application has already been downloaded and installed at this point |
| MFC-A2 | Start the Fuse device audit record collection |
| MFC-A3 | Automatically import file into the predefined Fuse folder location |
| | (Note: users cannot alter this) |
| MFC-A4 | Fuse Application locks the file so that it can only be viewed on the mobile device |
| MFC-A5 | Create the hash of the file including metadata |
| MFC-A6 | Create and store the hash of the audit record (from MFC-A2) |
| MFC-A7 | Store the hash for the file and audit record (files have both file hash and audit record hash) |
| MFC-A8 | The Fuse Application automatically sends a copy of the file and audit record along with the respective hashes (MFA-AS and MFA-AG) to Mea: Fuse Web Application |
| MFC-A9 | Start an Audit record relating to received data and validate the hashes received |
| MFC-A10 | Store the file in predefined folder location (replicate location of mobile device) and store the device audit record, hashes and a unique reference identifier (URN) in the application database. |
| MFC-A11 | Create hash for the new audit record and store in predefined folder |
| MFC-A12 | Commit a 'Master File' to the Blockchain that includes database unique identifier (URN). datetime, hash of the file (MFA-AS), hash of the device audit (MFA-A6) and hash of the web application audit (MFA-A11). |
| MFC-A13 | Commit 'Master File' to Blockchain |
| MFC-A14 | Generate Blockchain Transaction ID and send to Mea: Fuse web application |
| MFC-A15 | Store Blockchain Transaction ID in the application database with the URN of the file |
| MFC-A16 | Send a message back to the Mea: Fuse Mobile application to release the file lock |
| MFC-A17 | Release file lock |
| MFC-A18 | File made available to Move, Rename and Edit if a network connection is available |

| Note | Description |
| --- | --- |
| Note 1 | The application has already been downloaded and installed at this point |
| Note 2 | Activity on the device and web application are continually audited |
| Note 3 | Locked files can't be moved, edited or renamed |
| Note 4 | Users can generate a Blockchain validation certificate from this point onward |

TABLE 2

| Process | Description |
| --- | --- |
| MFA-A1 | User browses within Mea: Fuse web application to a file and selects to Amend |
| MFA-A2 | Start an Audit record relating to the amend process |

TABLE 2-continued

| | |
|---|---|
| MFA-A3 | Automatically validate the authenticity of the original file (using the public validator) prior to making a copy |
| MFA-A4 | Application makes a copy of the original file and stores it |
| MFA-A5 | Send copy to the web browser to allow the user to amend |
| MFA-A6 | User interacts with the online service to adjust the copied file and saves |
| MFA-A7 | Application saves the amended file along with the original master file URN |
| MFA-A8 | User selects to commit the amendments to blockchain |
| MFA-A9 | Create and store hashes for the Amended File, its Audit Record and a new child unique reference identifier (URN) in the application database. |
| MFA-A10 | Commit a 'master edit file' (new file) to the Blockchain that includes the new child Database unique identifier (URN), datetime, hash of the new file (MFA-A9), Hash of the Web Application Audit (MFA-A9) and the original file URN. |
| MFA-A11 | Commit Master Edit File to Blockchain |
| MFA-A12 | Generate Blockchain Transaction ID and send to Mea: Fuse Web Application |
| MFA-A13 | Store Transaction ID alongside the new URN for the master edit file |
| MFA-A14 | The amended file is now available for users |
| MFA-A15 | Master edit file available for mobile users with permission on the mobile application |

| Note | Description |
|---|---|
| Note 1 | Amend File is the process of editing a file via a web browser. For example cropping a file. This does not include renaming or moving files.<br>Users can only amend files with a network connection. |
| Note 2 | This check ensures any copy is taken from an authenticated original/parent file. Errors are stored in the audit |
| Note 3 | Users can generate a Blockchain validation certificate for the edited file from this point onward. |
| Note 4 | The originals file URN is saved to show the provenance of the amended copy |

TABLE 3

| Process | Description |
|---|---|
| MFP-A1 | User selects a file to validate and enters the claimed URN |
| MFP-A2 | Generate Hash for the file or related audit |
| MFP-A3 | Generate Hash for amended file or related audit record |
| MFP-A4 | Lookup up original provenance file and generate its hash or that of its audit record |
| MFP-A5 | Request Blockchain verification, using the URNs, for the selected files or related audit file(s) |
| MFP-A6 | Lookup Blockchain held validation data based on the provided URNs |
| MFP-A7 | Compare the Blockchain Hashes to the hash of the file being validated |
| MFP-A8 | Hashes dont match and provenance/authenticity check failed |
| MFP-A9 | Hashes match and provenance/authenticity confirmed on Domain |

| Note | Description |
|---|---|
| Note 1 | This is the process for a user initiating a validation of a file either from the Fuse application or web browser |
| Note 2 | Each edited file creates a Master Edit File that has the chain of custody reference to the master file. Each subsequent edited file inherits the validation of the file it is sourced from |
| Note 3 | This ensures that the original that the amended one is based on hasn't been tampered with |

TABLE 4

| Process | Description |
|---|---|
| MFS-A1 | Automatically check the user permissions of the sharer and receiver |
| MFS-A2 | User selects to share the file and sets the location where the file will be shared to |
| MFS-A3 | Copy the file to the new file area |

| Note | Description |
|---|---|
| Note 1 | Sharing files across domains is the process of sharing files with other Mea: Fuse users in a different domain.<br>Users can only share and view shared files with a network connection. |
| Note 2 | The assumption is that files remain available in both file stores.<br>The original master file can't be if chain of custody is required. |

The invention claimed is:

1. A method of generating a verifiable and immutable record and comprising, at a server system:
receiving from an end user computer device over a secure connection a user data file, a device audit file, a first bash value generated across the user data file and a second hash value generated across the device audit file;
hashing the user data file and the device audit file to generate respective third and fourth hash values and comparing the third and fourth hash values against the received first and second hash values respectively to validate the received data;
creating a server-side audit file;
generating a fifth hash value for the server-side audit file;
storing as a parent transaction record, the user data file, the device audit file, the server side audit file, and the first, second and fifth hash values, the parent transaction record being identified by a parent database URN;
carrying out a Blockchain transaction to commit to a Blockchain service a Master File including the first, second and fifth hash values and the parent database URN, where the parent database URN can be used subsequently by the server system to retrieve the Master File from the blockchain service; and
sending to the end user computer over the secure connection a notification confirming that the server system has verified the received data and has created an immutable record of the user data file and device audit file,
wherein, upon receipt of the notification, the end user computer device is permitted to change the stored user data file and/or device audit file in a secure memory location.

2. A method according to claim 1, wherein said verifiable and immutable record can be used subsequently as evidence in legal proceedings.

3. A method according to claim 1, said server system being implemented as a cloud server system.

4. A method of generating a verifiable and immutable record of an edited version of the user data file of claim 1 and comprising:
retrieving the user data file, the first hash value and the parent database URN, from the parent transaction record;
using the parent database URN to retrieve the Master File from the Blockchain service and using the Master File to validate the user data file;
obtaining an edited version of the user data file;
hashing the edited version to generate a sixth hash value;
creating an updated server-side audit file;
generating a seventh hash value for the updated server-side audit file;
storing as a child transaction record, the edited version of the user data file, the updated server side audit file, the sixth and seventh hash values and the parent database URN, the child transaction record being identified by a child database URN;
carrying out a Blockchain transaction to commit to the Blockchain service a child Master File including the child database URN, the parent database URN, and the sixth and seventh hash values, where the child database URN can be used subsequently by the server system to retrieve the child Master File from the blockchain service.

5. A method according to claim 3 and comprising repeating the process for a further edited version of the first edited version of the user data file, where the parent database URN is replaced by the first child database URN and a new child database URN is used to identify a new child transaction record.

6. A method according to claim 4, wherein said step of obtaining an edited version of a user data file comprises receiving instructions to edit the user data file from an end user computer device.

7. A method of verifying an edited version of an edited user data file stored in a child transaction record according to claim 4, the method comprising using the child database URN of the edited user data file to obtain the associated new Master File from the Blockchain service, using the sixth and seventh hash values contained in the new Master File to validate the edited user data file, and, if the new Master File includes a database URN of a preceding child transaction record or a parent transaction record, repeating the process for the preceding child transaction record or a parent transaction record and, if necessary, for each further preceding child transaction record until the parent transaction record has been validated.

* * * * *